US012704930B2

(12) United States Patent
McCracken et al.

(10) Patent No.: US 12,704,930 B2
(45) Date of Patent: Aug. 11, 2026

(54) TOUCH-SENSING PATTERN FOR MULTI-ANGULAR ORIENTATIONS

(71) Applicant: Google LLC, Mountain View, CA (US)

(72) Inventors: Merrick Kam McCracken, Sunnyvale, CA (US); Tauseef Muzaffar, Santa Clara, CA (US); Yao Xue, San Jose, CA (US); Max Koopman, San Francisco, CA (US); Chun Yat Frank Li, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 162 days.

(21) Appl. No.: 18/733,145

(22) Filed: Jun. 4, 2024

(65) Prior Publication Data

US 2024/0319829 A1 Sep. 26, 2024

Related U.S. Application Data

(60) Provisional application No. 63/652,950, filed on May 29, 2024.

(51) Int. Cl.
*G06F 3/044* (2006.01)
*H04R 1/10* (2006.01)

(52) U.S. Cl.
CPC ........... *G06F 3/044* (2013.01); *H04R 1/1016* (2013.01); *H04R 1/1041* (2013.01)

(58) Field of Classification Search
CPC ...... G06F 3/044; H04R 1/1016; H04R 1/1041
See application file for complete search history.

(56) References Cited

U.S. PATENT DOCUMENTS

2017/0285781 A1 10/2017 Degner et al.
2019/0297408 A1* 9/2019 Mohammadi ........ H04R 1/1016
2020/0089373 A1* 3/2020 Liu ......................... G06F 3/044
2020/0100010 A1* 3/2020 Yang ........................ H04R 1/10
2022/0174391 A1* 6/2022 Ding ....................... G06F 3/165
2023/0100759 A1* 3/2023 Zyskind .................. H04S 7/302
381/74
2023/0301408 A1 9/2023 Chawan et al.

OTHER PUBLICATIONS

"How to Control Bose Wireless Earbuds: Tap, Swipe, and Press", Retrieved at: https://www.bose.com/stories/how-to-control-bose-wireless-earbuds—on Apr. 5, 2024, 6 pages.
"Touchpad Commands for Your Samsung Earbuds", Retrieved at: https://www.samsung.com/us/support/answer/ANS00078137/—on Apr. 5, 2024.

* cited by examiner

*Primary Examiner* — Olisa Anwah
(74) *Attorney, Agent, or Firm* — Colby Nipper PLLC

(57) ABSTRACT

An electronic device that includes a touch-sensing device having a plurality of touch sensors arranged in a pattern configured to detect user input at a plurality of angular orientations is disclosed. The user input may be a horizontal swipe across the touch-sensing device or a vertical swipe down a vertical centerline of the touch-sensing device. The plurality of touch sensors includes a first sensor, a second sensor, a third sensor, a fourth sensor, and a fifth sensor. The touch sensors are configured to detect, via at least three sensors, the user input for one or more angular orientations of a wireless earbud between 85 degrees forward of an initial vertical position of the vertical centerline and 85 degrees rearward of the initial vertical position of the vertical centerline.

20 Claims, 6 Drawing Sheets

TOUCH-SENSING PATTERN FOR MULTI-ANGULAR ORIENTATIONS

CROSS-REFERENCE TO RELATED APPLICATION(S)

This application claims the benefit of U.S. Provisional Patent Application Ser. No. 63/652,950 filed on May 29, 2024, the disclosure of which is incorporated by reference herein in its entirety.

SUMMARY

This document describes systems and techniques directed at a touch-sensing pattern for multi-angular orientations. A touch-sensing device includes a plurality of touch sensors that are arranged in a pattern configured to detect user input at a plurality of angular orientations of the touch-sensing device. The user input may be a horizontal swipe across the touch sensors or a vertical swipe down a vertical centerline of the pattern of touch sensors.

In one implementation, an electronic device includes a touch-sensing device having a plurality of touch sensors arranged in a pattern configured to detect user input at a plurality of angular orientations, the plurality of touch sensors including a first sensor having a first end, a second end, a first outer arc connecting the first end to the second end, a first inner arc connecting the first end to the second end, and a first horizontal centerline. The first sensor has a first variable width between the first outer arc and the first inner arc, the first variable width having a largest width at substantially the first horizontal centerline. The plurality of touch sensors includes a second sensor having a third end, a fourth end, a second outer arc connecting the third end to the fourth end, a second inner arc connecting the third end to the fourth end, and a second horizontal centerline. The second sensor has a second variable width between the second outer arc and the second inner arc, the second variable width having a largest width at substantially the second horizontal centerline.

The plurality of touch sensors includes a third sensor positioned between the first sensor and the second sensor, the third sensor having a fifth end, a sixth end, and a first length that extends from the fifth end to the sixth end, the fifth end of the third sensor being proximate to the third end of the second sensor and the sixth end of the third sensor being proximate to the fourth end of the second sensor.

The plurality of touch sensors includes a fourth sensor positioned between the first sensor and the third sensor, the fourth sensor having a seventh end, an eighth end, and a second length that extends from the seventh end to the eighth end, the seventh end of the fourth sensor being proximate to the first end of the first sensor and the eighth end of the fourth sensor being proximate to the first horizontal centerline.

The plurality of touch sensors includes a fifth sensor positioned between the first sensor and the third sensor, the fifth sensor having a ninth end, a tenth end, and a third length that extends from the ninth end to the tenth end, the tenth end of the fifth sensor being proximate to the second end of the first sensor and the ninth end of the fifth sensor being proximate to the first horizontal centerline. These and other implementations are described in further detail herein.

The details of one or more implementations are set forth in the accompanying Drawings and the following Detailed Description. Other features and advantages will be apparent from the Detailed Description, the Drawings, and the Claims. This Summary is provided to introduce subject matter that is further described in the Detailed Description. Accordingly, a reader should not consider the Summary to describe essential features nor limit the scope of the claimed subject matter.

BRIEF DESCRIPTION OF DRAWINGS

Apparatuses of and techniques for an electronic device with a touch-sensing device are described with reference to the following drawings. The same numbers are used throughout the drawings to reference like features and components.

FIG. 1-2 illustrates the example touch-sensing device of FIG. 1-1.

FIG. 2 illustrates an example electronic device that includes a touch-sensing device.

DETAILED DESCRIPTION

Overview

Wireless earbuds may be used to listen to audio from various electronic devices. A wireless earbud is typically designed to be inserted into a user's ear with a specific angular orientation. The wireless earbud may include touch sensors to enable user input such as a horizontal swipe across the wireless earbud. If the wireless earbud is stemless, the horizontal swipe may be across the external surface of the wireless earbud, for example, the user may not insert the wireless earbud into the ear at the specific angular orientation. Instead, the user may rotate the wireless earbud forward or rearward of the intended orientation due to differences in the user's ear and/or for desired comfort. The larger the deviation from the specific angular orientation, the more difficult it may be for the touch sensor to properly register the user input. For example, as the rotation of the wireless earbud approaches 90 degrees from the intended angular orientation, a horizontal swipe may appear to be a vertical swipe to the touch sensor. A touch-sensing device that may be able to detect a horizontal swipe across multiple angular orientations of a wireless earbud may be beneficial.

To this end, this document describes systems and techniques direct at an electronic device that includes a touch-sensing device having a plurality of touch sensors arranged in a pattern configured to detect user input at a plurality of angular orientations is disclosed. The user input may be a horizontal swipe across the touch-sensing device or a vertical swipe down a vertical centerline of the touch-sensing device. The plurality of touch sensors includes a first sensor, a second sensor, a third sensor, a fourth sensor, and a fifth sensor. The touch sensors are configured to detect, via at least three sensors, the user input for one or more angular orientations of a wireless earbud between 85 degrees forward of an initial vertical position of the vertical centerline and 85 degrees rearward of the initial vertical position of the vertical centerline.

The following discussion describes operating environments and techniques that may be employed in the operating environments and example methods. Although systems and techniques for touch-sensing pattern for multi-angular orientations are described, it is to be understood that the subject of the appended Claims is not necessarily limited to the specific features or methods described. Rather, the specific features and methods are disclosed as example implementations and reference is made to the operating environment by way of example only.

Example Apparatuses and Systems

Figure 1:
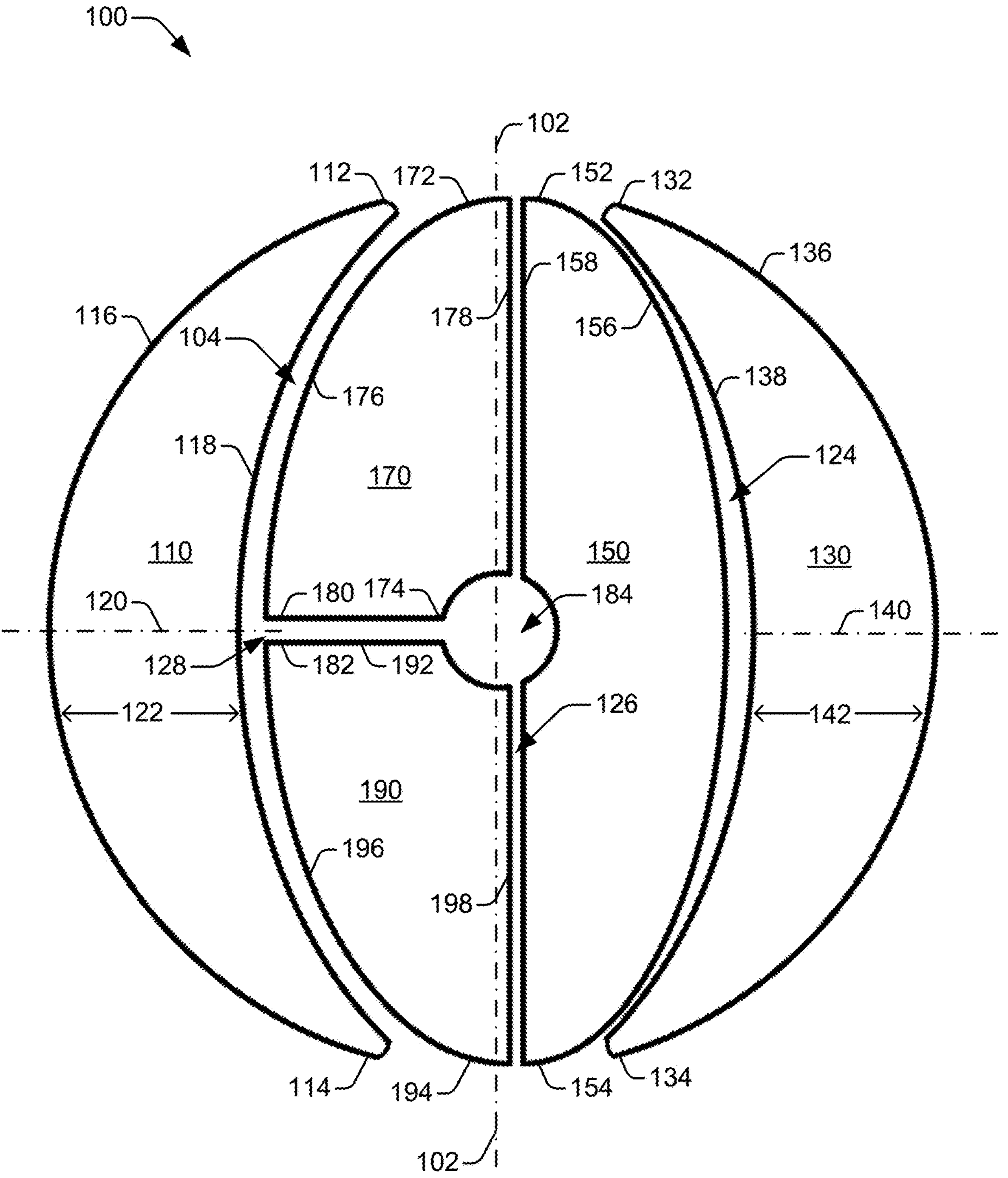
FIG. 1-1 illustrates an example touch-sensing device with touch sensors arranged in a pattern.
Figures 1, 2:
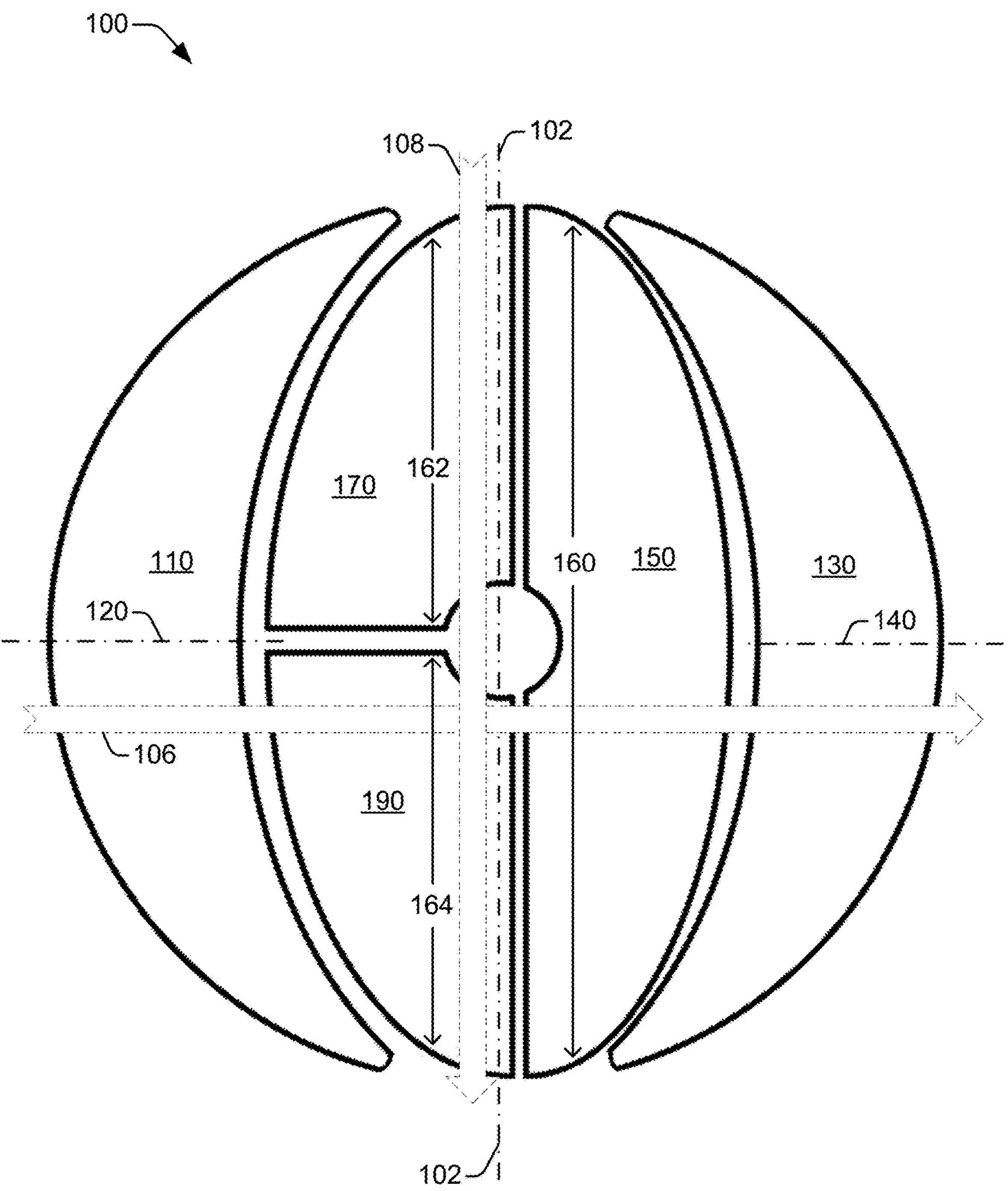
Figure 2:
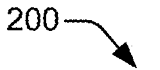
Figure 2:
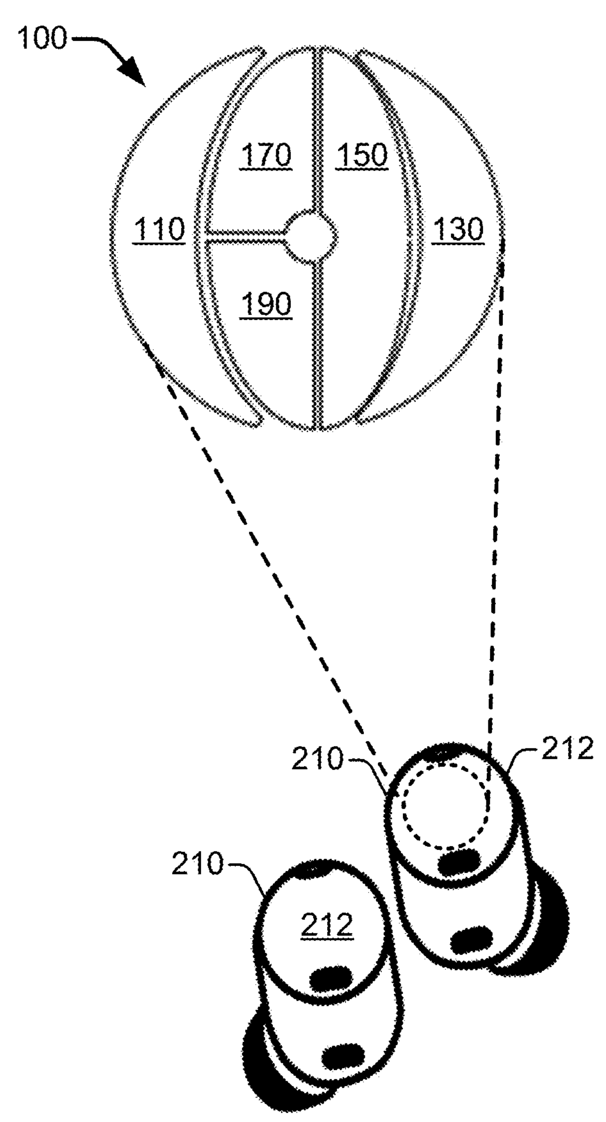

FIG. 1-1 and FIG. 1-2 illustrate a touch-sensing device 100 having a plurality of touch sensors 110, 130, 150, 170, 190 arranged in a pattern configured to detect user input at a plurality of angular orientations. The touch-sensing device 100 may be coupled to (e.g., integrated within, wirelessly connected to) an electronic device (not shown in FIG. 1-1 and FIG. 1-2) and may be configured to detect user input to the electronic device. The touch-sensing device 100 includes a first sensor 110 having a first end 112, a second end 114, a first outer arc 116 connecting the first end 112 to the second end 114, and a first inner arc 118 connecting the first end 112 to the second end 114. The first sensor 110 includes a first horizontal centerline 120 and has a first variable width 122 between the first outer arc 116 and the first inner arc 118. The first variable width 122 is the largest at substantially the first horizontal centerline 120.

The touch-sensing device 100 includes a second sensor 130 having a third end 132, a fourth end 134, a second outer arc 136 connecting the third end 132 to the fourth end 134, and a second inner arc 138 connecting the third end 132 to the fourth end 134. The second sensor 130 includes a second horizontal centerline 140 and has a second variable width 142 between the second outer arc 136 and the second inner arc 138. The second variable width 142 is the largest at substantially the second horizontal centerline 140.

The touch-sensing device 100 includes a third sensor 150 positioned between the first sensor 110 and the second sensor 130. The third sensor 150 has a fifth end 152, a sixth end 154, and a first length 160 (shown in FIG. 1-2) that extends from the fifth end 152 to the sixth end 154. The fifth end 152 of the third sensor 150 is proximate to the third end 132 of the second sensor 130, and the sixth end 154 of the third sensor 150 is proximate to the fourth end 134 of the second sensor 130. The third sensor 130 includes a first arcuate side 156 proximate to the second sensor 130 and a first flat side 158 proximate to fourth and fifth sensors 170, 190.

The touch-sensing device 100 includes the fourth sensor 170 positioned between the first sensor 110 and the third sensor 150. The fourth sensor 170 has a seventh end 172, an eighth end 174, and a second length 162 (shown in FIG. 1-2) that extends from the seventh end 172 to the eighth end 174. The seventh end 172 of the fourth sensor 170 is proximate to the first end 112 of the first sensor 110, and the eighth end 174 of the fourth sensor 170 is proximate to the first horizontal centerline 120. The fourth sensor 170 includes a second arcuate side 176 proximate to the first sensor 110, a second flat side 178 proximate to the third sensor 150, and a third flat side 180 proximate to the fifth sensor 190.

The touch-sensing device 100 includes the fifth sensor 190 positioned between the first sensor 110 and the third sensor 150. The fifth sensor 190 has a ninth end 192, a tenth end 194, and a third length 164 (shown in FIG. 1-2) that extends from the ninth end 192 to the tenth end 194. The tenth end 194 of the fifth sensor 190 is proximate to the second end 114 of the first sensor 110, and the ninth end 192 of the fifth sensor 190 is proximate to the first horizontal centerline 120. The fifth sensor 190 includes a third arcuate side 196 proximate to the first sensor 110, a fourth flat side 198 proximate to the third sensor 150, and a fifth flat side 182 proximate to the fourth sensor 170.

The touch-sensing device 100 includes a first gap 104 positioned between the first inner arc 118 of the first sensor 110 and the second and third arcuate sides 176, 196 of the fourth and fifth sensors 170, 190. The touch-sensing device 100 includes a second gap 124 positioned between the second inner arc 138 of the second sensor 130 and the first arcuate side 156 of the third sensor 150. The touch-sensing device 100 includes a third gap 126 positioned between the first flat side 158 of the third sensor 150 and the second and fourth flat sides 178, 198 of the fourth and fifth sensors 170, 190. The touch-sensing device 100 includes a fourth gap 128 positioned between the third flat side 180 of the fourth sensor 170 and the fifth flat side 182 of the fifth sensor 190. The touch-sensing device 100 includes a substantially circular gap 184 positioned between the third sensor 150, the fourth sensor 170, and the fifth sensor 190.

The gaps 104, 124, 126, 128, and 184 separate the touch sensors 110, 130, 150, 170, 190 into distinct touch sensors configured in a pattern for the touch-sensing device 100. In one implementation, the gaps 104, 124, 126, and 128 may each have a width of 0.1 to 0.2 millimeters. The fourth gap 128 is substantially aligned with the first and second horizontal centerlines 120, 140.

The touch-sensing device 100 includes a vertical centerline 102. The vertical centerline 102 has an initial vertical position as shown in FIG. 1-1 and FIG. 1-2. The plurality of touch sensors 110, 130, 150, 170, 190 are configured to detect a user input across the touch-sensing device 100. For example, the plurality of touch sensors 110, 130, 150, 170, 190 are configured to detect a horizontal swipe depicted by arrow 106 in FIG. 1-2. The touch-sensing device 100 is configured to detect a horizontal swipe at various angular orientations of the touch-sensing device 100 as discussed herein. The plurality of touch sensors 110, 130, 150, 170, 190 are configured to detect a vertical swipe substantially along the vertical centerline 102 as depicted by arrow 108 in FIG. 1-2.

The third gap 126 is offset from the vertical centerline 102. The fourth and fifth sensors 170, 190 are configured to detect a vertical swipe depicted by arrow 108 substantially along the vertical centerline 102. The placement of at least portions of two sensors (e.g., the fourth and fifth sensor 170, 190) in line with the vertical centerline 102 may enable the touch-sensing device 100 to detect a vertical swipe depicted by arrow 108 substantially along the vertical centerline 102 of the touch-sensing device 100. The plurality of touch sensors 110, 130, 150, 170, 190 may be various touch sensors such as capacitive sensors, surface acoustic wave touch sensors, resistive touch sensors, infrared touch sensors, optical imaging touch sensors, acoustic pulse recognition touch sensors, or the like.

In such a configuration, the touch-sensing pattern is configured to detect user input at a plurality of angular orientations is disclosed. For example, a user input may be a horizontal swipe across the touch-sensing device. The touch-sensing pattern of touch sensors may detect a horizontal swipe across the pattern of touch sensors. The touch sensors are configured to detect, via at least three sensors, the user input for one or more angular orientations of a wireless earbud. This enables a touch-sensing device that includes the pattern of touch sensors to detect a horizontal swipe when the device has be rotated forward or rearward of an specified initial orientation.

FIG. 2 illustrates an example system 200 that includes an electronic device (e.g., wireless earbuds 210) having a touch-sensing device 100. The touch-sensing device 100 includes a plurality of touch sensors 110, 130, 150, 170, 190. As illustrated, the wireless earbuds 210 include a surface 212 (e.g., an exterior housing). In implementations, the touch-sensing device 100 is positioned underneath and/or contiguous with the surface 212 as indicated by a dashed circle. For example, the touch-sensing device 100 may be located on a flexible printed circuit and be adhered to the enclosure of the wireless earbud 210 proximate to the surface 212 via a pressure-sensitive adhesive as would be appreciated by one of ordinary skill in the art having the benefit of this disclosure. The wireless earbud 210 may be a stemless wireless earbud, which may reduce a touchable area of the wireless earbud 210 for user input. For example, the surface 212 of the wireless earbud 210 may have a diameter of approximately 7.2 millimeters.

As discussed herein, the angular orientation of the wireless earbud 210 may vary between users. Some users may insert the wireless earbud 210 with a vertical centerline 102 (shown in FIG. 1-1 and FIG. 1-2) remaining in its initial vertical orientation. Other users may rotate the wireless earbud 210 forward or rearward of the initial vertical orientation of the vertical centerline 102 depending on the shape of the ear and/or the fit of the wireless earbud 210. The use of the touch-sensing device 100 disclosed herein with the wireless earbud 210 may enable the detection of a horizontal swipe, or other user input, for one or more angular orientations of the wireless earbud 210 within the user's ear. In one implementation, the use of the touch-sensing device 100 disclosed herein with the wireless earbud 210 may enable the detection of a horizontal swipe, or other user input, for all angular orientations between approximately 85 degrees forward and 85 degrees rearward of the initial position of the vertical centerline 102 of the touch-sensing device 100. The touch-sensing device 100 includes first and second sensors 110, 130 that are substantially crescent-shaped, a third sensor 150 that is substantially semioval-shaped, and fourth and fifth sensors 170, 190 that are each substantially shaped as a quarter of an oval.

In one implementation, the first, second, and third sensors 110, 130, 150 each have an area of approximately 8.7 $mm^2$ and the fourth and fifth sensors 170, 190 each have an area of approximately 5 $mm^2$. Each sensor 110, 130, 150, 170, 190 has an area large enough to register a user input while being configured so that the small touch-sensing device 100 (e.g., diameter of 7.2 approximately millimeters) may be used on the wireless earbud 210. The touch sensors 110, 130, 150, 170, 190 of the touch-sensing device 100 are configured to detect user input to the wireless earbud 210. Although FIG. 2 shows the touch-sensing device 100 coupled with a single wireless earbud 210 of the pair of wireless earbuds 210, each wireless earbud 210 may include the touch-sensing device 100 as would be appreciated by one of ordinary skill in the art having the benefit of this disclosure.

Figure 3:
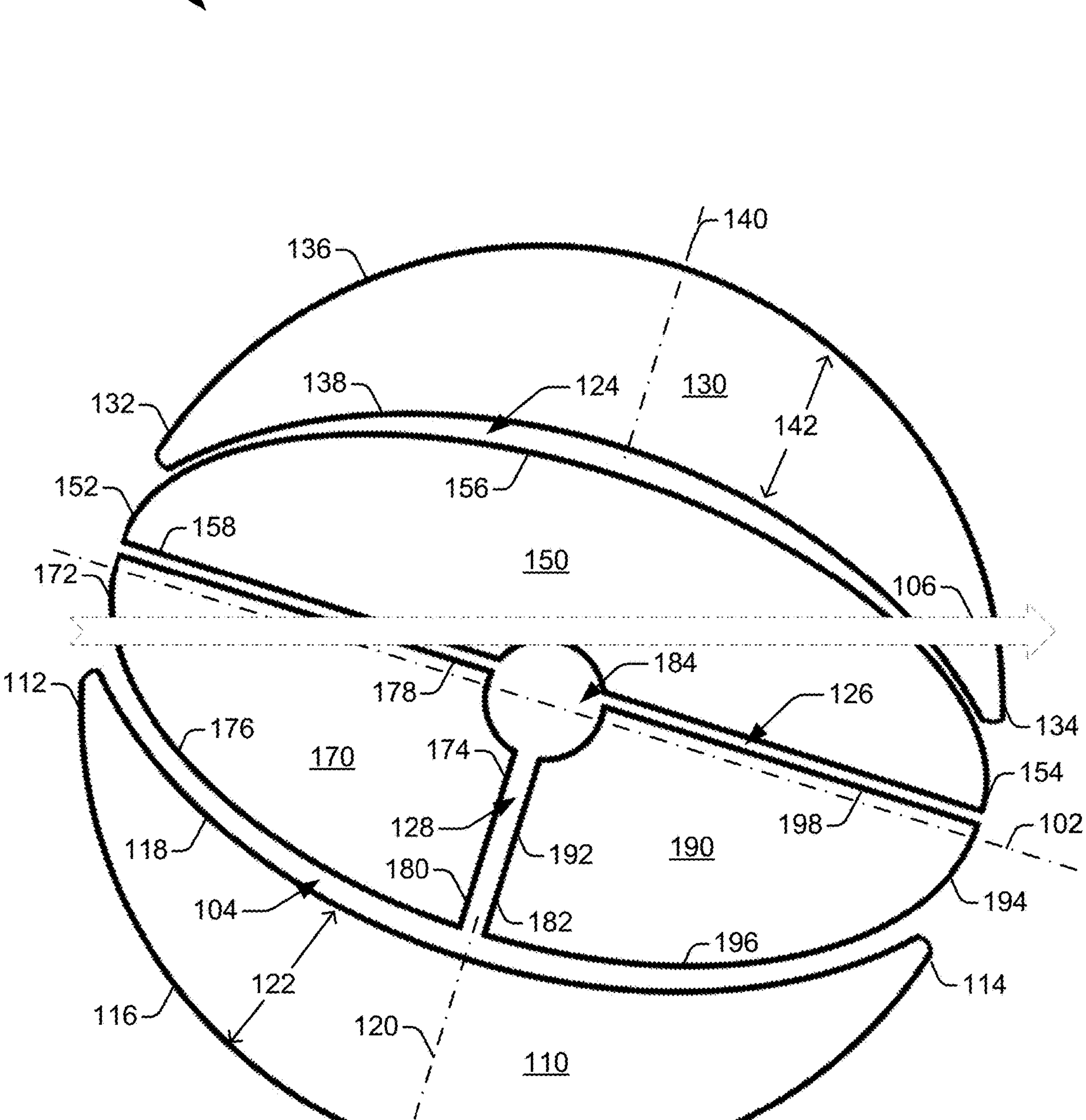
FIG. 3 illustrates an example touch-sensing device at an angular orientation rearward of an initial position of a vertical centerline of the touch-sensing device.

FIG. 3 illustrates an example touch-sensing device 100 at an angular orientation rearward 300 of an initial position (shown in FIG. 1-1) of a vertical centerline 102 of the touch-sensing device 100. An electronic device (e.g., a wireless earbud) coupled to the touch-sensing device 100 is not shown for clarity. As shown in FIG. 3, the touch-sensing device 100 has been rotated rearward of the initial position. A horizontal swipe (depicted as arrow 106) is closer to a swipe down the vertical centerline 102 than a swipe along first and second horizontal centerlines 120, 140 due to the rotation of the touch-sensing device 100. However, a configuration of touch sensors 110, 130, 150, 170, 190 ensures that the horizontal swipe still crosses the fourth sensor 170, the third sensor 150, and the second sensor 130. The touch-sensing device 100 can determine that the intended user input is a horizontal swipe based on the user input crossing at least three sensors 170, 150, 130. If the user were to swipe a little lower than depicted, the user's finger could pass through four touch sensors, namely, the first sensor 110, the fourth sensor 170, the fifth sensor 190, and the third sensor 150. This configuration of the touch sensors 110, 130, 150, 170, 190 ensures that multiple sensors are crossed by a horizontal swipe regardless of the angular orientation of the touch-sensing device 100, which enables the touch-sensing device 100 to determine that a horizontal swipe was intended.

Figure 4:
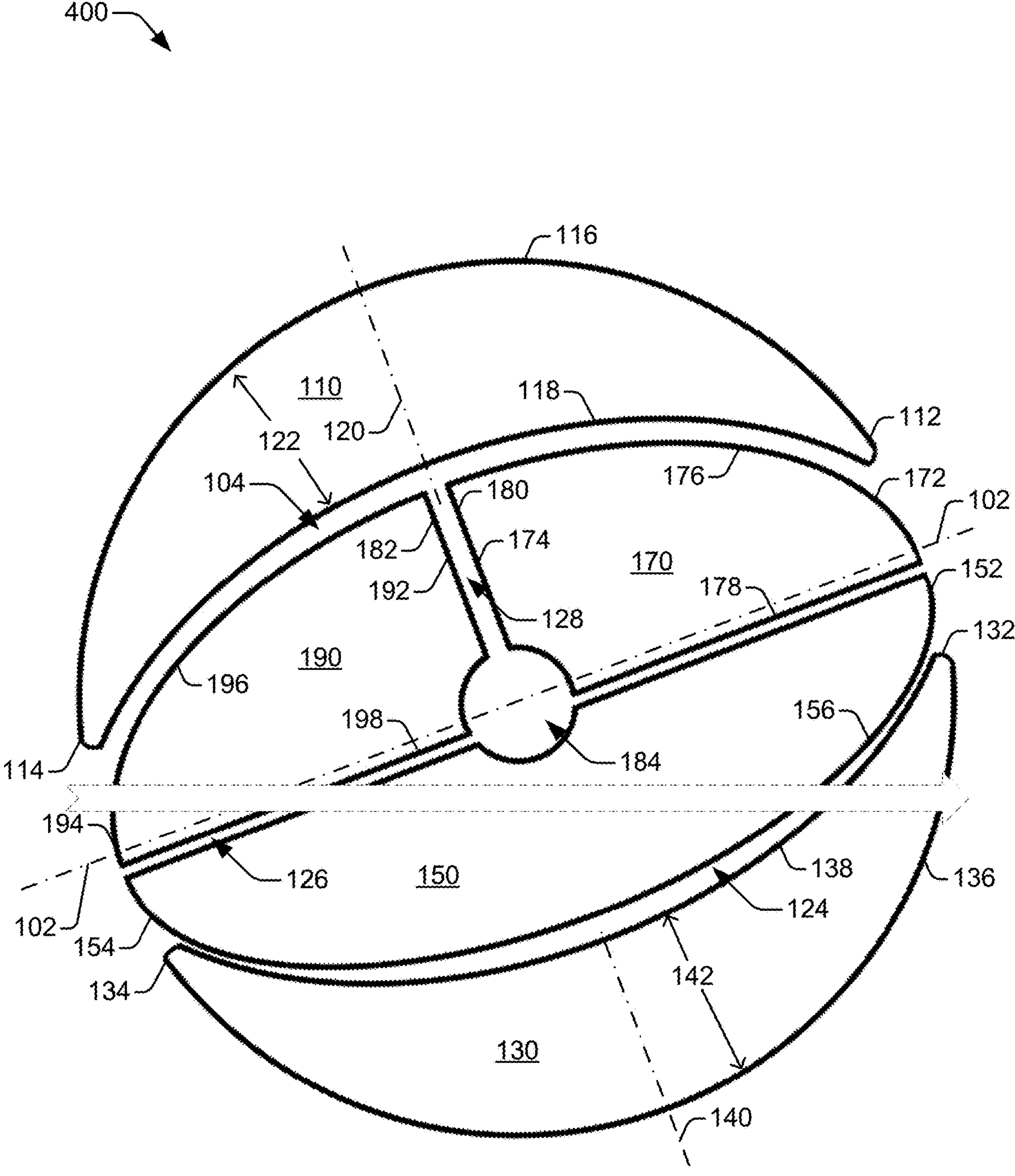
FIG. 4 illustrates an example touch-sensing device at an angular orientation forward of an initial position of a vertical centerline of the touch-sensing device.

FIG. 4 illustrates an example touch-sensing device 100 at an angular orientation forward 400 of an initial position (shown in FIG. 1-1) of a vertical centerline 102 of the touch-sensing device 100. An electronic device (e.g., a wireless earbud) coupled to the touch-sensing device 100 is not shown for clarity. As shown in FIG. 4, the touch-sensing device 100 has been rotated forward of the initial position. A horizontal swipe (depicted as arrow 106) is closer to a swipe down the vertical centerline 102 than a swipe along first and second horizontal centerlines 120, 140 due to the rotation of the touch-sensing device 100. However, a configuration of touch sensors 110, 130, 150, 170, 190 ensures that the horizontal swipe by the user still crosses the fifth sensor 190, the third sensor 150, and the second sensor 130. The touch-sensing device 100 can determine that the user input intended is a horizontal swipe based on the swipe crossing at least three sensors 190, 150, 130. As discussed herein, this configuration of the touch sensors 110, 130, 150, 170, 190 ensures that multiple sensors are crossed by a horizontal swipe regardless of the angular orientation of the touch-sensing device 100, which enables the touch-sensing device 100 to determine that a horizontal swipe was intended by the user.

Example Electronic Device

Figure 5:
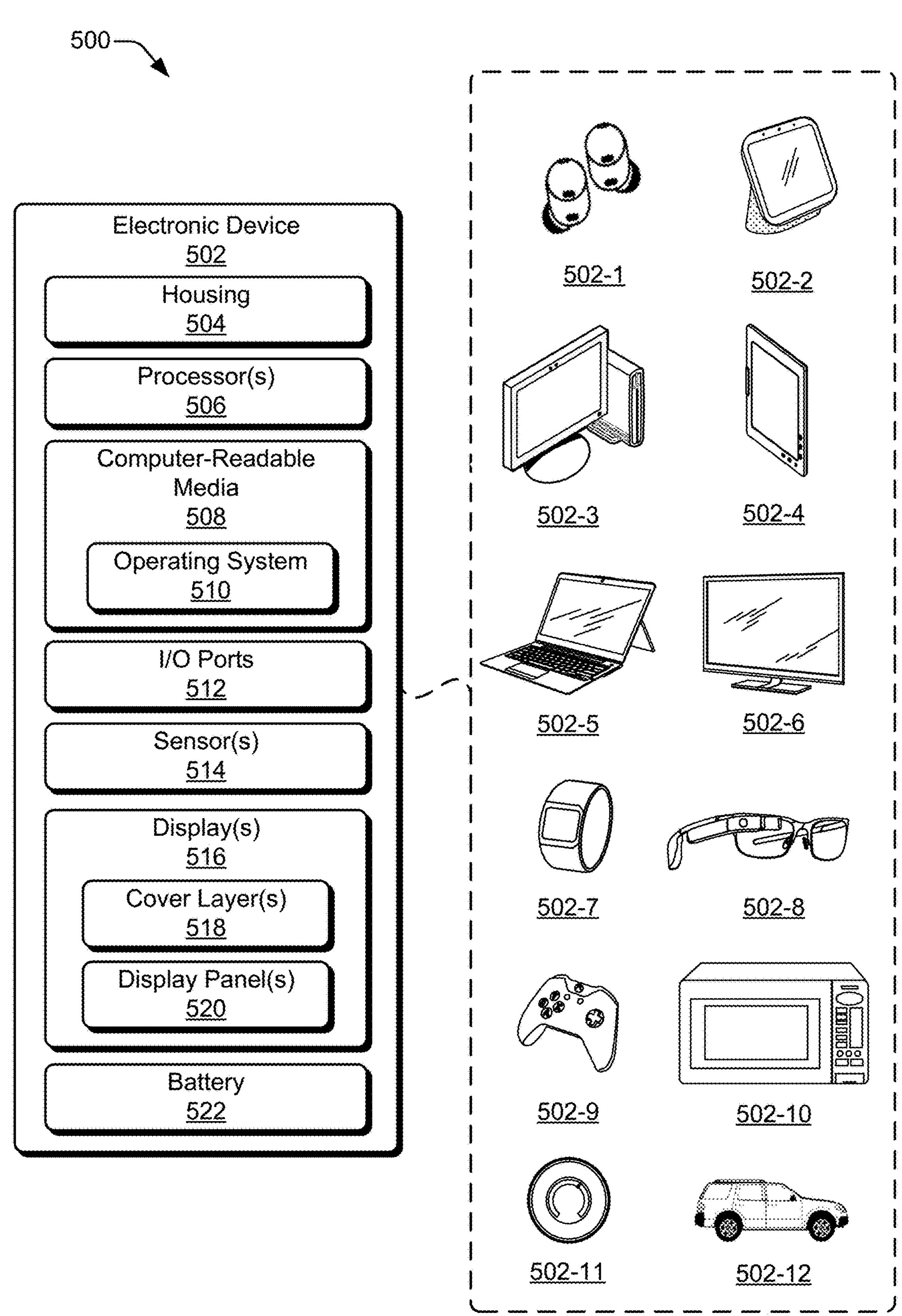
FIG. 5 illustrates an example electronic device having internal hardware configurations for a touch-sensing device with a pattern of touch sensors in accordance with one or more implementations.

FIG. 5 illustrates an example electronic device 502 that includes a touch-sensing pattern of touch sensors in accordance with one or more implementations. The electronic device 502 may include additional components and interfaces omitted from FIG. 5 for the sake of clarity. The electronic device 502 is illustrated with various non-limiting example electronic devices 502, including wireless earbuds 502-1, a smart display associated with a home-automation and control system 502-2, a desktop computer 502-3, a tablet 502-4, a laptop 502-5, a television 502-6, a computing watch 502-7, computing glasses 502-8, a gaming system 502-9, a microwave 502-10, a smart thermostat interface 502-11, and an automobile having computing capabilities 502-12. Other devices may also be used, such as wired earbuds, a security camera, a trackpad, a drawing pad, a netbook, an e-reader, other forms of a home-automation and control systems, a wall display, a virtual-reality headset, another vehicle (e.g., an e-bike or plane), and other home appliances, to name just a few examples. Note that the electronic device 502 may be wearable, non-wearable but mobile, or relatively immobile (e.g., desktops and appliances), all without departing from the scope of the present teachings.

The electronic device 502 includes a housing 504, which defines at least one internal cavity within which one or more of a plurality of electronic components may be disposed. In implementations, a mechanical frame may define one or more portions of the housing 504. As an example, a mechanical frame can include plastic or metallic walls that define portions of the housing 504. In additional implementations, a mechanical frame may support one or more portions of the housing 504. As an example, one or more exterior housing components (e.g., plastic panels) can be attached to the mechanical frame (e.g., a chassis). In so doing, the mechanical frame physically supports the one or more exterior housing components, which define portions of the housing 504. In implementations, the mechanical frame and/or the exterior housing components may be composed of crystalline or non-crystalline solids. In implementations, the housing 504 may be sealed through the inclusion of one or more displays (e.g., at least one display 516), defining at least one internal cavity.

The electronic device 502 may further include one or more processors 506. The processor(s) 506 can include, as non-limiting examples, a system on a chip (SoC), an application processor (AP), a central processing unit (CPU), or a graphics processing unit (GPU). The processor(s) 506 generally execute commands and processes utilized by the electronic device 502 and an operating system installed thereon. For example, the processor(s) 506 may perform operations to display graphics of the electronic device 702 on the one or more displays and can perform other specific computational tasks.

The electronic device 502 may also include computer-readable storage media (CRM) 508. The CRM 508 may be a suitable storage device configured to store device data of the electronic device 502, user data, and multimedia data. The CRM 508 may store an operating system 510 that generally manages hardware and software resources (e.g., the applications) of the electronic device 502 and provides common services for applications stored on the CRM 508. The operating system 510 and the applications are generally executable by the processor(s) 506 to enable communications and user interaction with the electronic device 502. One or more processor(s) 506, such as a GPU, perform operations to display graphics of the electronic device 502 on the one or more displays and can perform other specific computational tasks. The processor(s) 506 can be single-core or multiple-core processors.

The electronic device 502 may also include input/output (I/O) ports 512. The I/O ports 512 allow the electronic device 502 to interact with other devices or users. The I/O ports 512 may include any combination of internal or external ports, such as universal serial bus (USB) ports, audio ports, Serial ATA (SATA) ports, PCI-express based ports or card-slots, secure digital input/output (SDIO) slots, and/or other legacy ports.

The electronic device 502 may further include one or more sensors 514. The sensor(s) 514 can include any of a variety of sensors, such as an audio sensor (e.g., a microphone), a touch-input sensor (e.g., a touchscreen), an image-capture device (e.g., a camera, video-camera), proximity sensors (e.g., capacitive sensors), an under-display fingerprint sensor, or an ambient light sensor (e.g., photodetector). In implementations, the electronic device 502 includes one or more of a front-facing sensor(s) and a rear-facing sensor (s).

The electronic device 502 may include the one or more displays 516, may have one or more cover layers 518 and one or more display panels 520. The cover layer(s) 518 may be implemented as any of a variety of transparent materials including polymers (e.g., plastic, acrylic) or glasses.

The electronic device 502 further includes a battery 522. In implementations, the battery 522 is a rechargeable battery that is configured to store and supply electrical energy. The rechargeable battery 522 may be any suitable rechargeable battery, such as a lithium-ion (Li-ion) battery.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Terms such as "above," "below," or "underneath" are not intended to require any particular orientation of a device. Rather, a first layer or component, being provided "above" a second layer or component is intended to describe the first layer being at a higher Z-dimension than the second layer of component within the particular coordinate system in use. It will be understood that should the component be provided in another orientation, or described in a different coordinate system, then such relative terms may be changed.

Although implementations for a touch-sensing pattern for multi-angular orientations have been described in language specific to certain features and/or methods, the subject of the appended claims is not necessarily limited to the specific features or methods described. Rather, the specific features and methods are disclosed as example implementations for a touch-sensing pattern for multi-angular orientations.

What is claimed is:

1. An electronic device comprising:

a touch-sensing device comprising a plurality of touch sensors arranged in a pattern configured to detect user input at a plurality of angular orientations, the plurality of touch sensors comprising:

a first sensor having a first end, a second end, a first outer arc connecting the first end to the second end, a first inner arc connecting the first end to the second end, and a first horizontal centerline, the first sensor having a first variable width between the first outer arc and the first inner arc, the first variable width having a largest width at substantially the first horizontal centerline;

a second sensor having a third end, a fourth end, a second outer arc connecting the third end to the fourth end, a second inner arc connecting the third end to the fourth end, and a second horizontal centerline, the second sensor having a second variable width between the second outer arc and the second inner arc, the second variable width having a largest width at substantially the second horizontal centerline;

a third sensor positioned between the first sensor and the second sensor, the third sensor having a fifth end, a sixth end, and a first length that extends from the fifth end to the sixth end, the fifth end proximate to the third end of the second sensor and the sixth end proximate to the fourth end of the second sensor;

a fourth sensor positioned between the first sensor and the third sensor, the fourth sensor having a seventh end, an eighth end, and a second length that extends from the seventh end to the eighth end, the seventh end proximate to the first end of the first sensor and the eighth end proximate to the first horizontal centerline; and a fifth sensor positioned between the first sensor and the third sensor, the fifth sensor having a ninth end, a tenth end, and a third length that extends from the ninth end to the tenth end, the tenth end proximate to the second end of the first sensor and the ninth end proximate to the first horizontal centerline, wherein the electronic device comprises a wireless earbud, the electronic device further comprising a vertical centerline for the touch-sensing device, the vertical centerline having an initial vertical position, and wherein the plurality of touch sensors is disposed proximate to a surface of the wireless earbud, the plurality of touch sensors configured to detect, via at least three sensors of the plurality of touch sensors, user input at the surface of the wireless earbud, and wherein the plurality of touch sensors are configured to detect, via the at least three sensors of the plurality of touch sensors, the user input for one or more angular orientations of the wireless earbud between 85 degrees forward of the initial vertical position of the vertical centerline and 85 degrees rearward of the initial vertical position of the vertical centerline.

2. An electronic device comprising:

a touch-sensing device comprising a plurality of touch sensors arranged in a pattern configured to detect user input at a plurality of angular orientations, the plurality of touch sensors comprising:

a first sensor having a first end, a second end, a first outer arc connecting the first end to the second end, a first inner arc connecting the first end to the second end, and a first horizontal centerline, the first sensor having a first variable width between the first outer arc and the first inner arc, the first variable width having a largest width at substantially the first horizontal centerline;

a second sensor having a third end, a fourth end, a second outer arc connecting the third end to the fourth end, a second inner arc connecting the third end to the fourth end, and a second horizontal centerline, the second sensor having a second variable width between the second outer arc and the second inner arc, the second variable width having a largest width at substantially the second horizontal centerline;

a third sensor positioned between the first sensor and the second sensor, the third sensor having a fifth end, a sixth end, and a first length that extends from the fifth end to the sixth end, the fifth end proximate to the third end of the second sensor and the sixth end proximate to the fourth end of the second sensor;

a fourth sensor positioned between the first sensor and the third sensor, the fourth sensor having a seventh end, an eighth end, and a second length that extends from the seventh end to the eighth end, the seventh end proximate to the first end of the first sensor and the eighth end proximate to the first horizontal centerline; and a fifth sensor positioned between the first sensor and the third sensor, the fifth sensor having a ninth end, a tenth end, and a third length that extends from the ninth end to the tenth end, the tenth end proximate to the second end of the first sensor and the ninth end proximate to the first horizontal centerline, wherein the electronic device comprises a wireless earbud, the electronic device further comprising a vertical centerline for the touch-sensing device, the vertical centerline having an initial vertical position, and wherein the plurality of touch sensors is disposed proximate to a surface of the wireless earbud, the plurality of touch sensors configured to detect, via at least three sensors of the plurality of touch sensors, user input at the surface of the wireless earbud, and wherein the plurality of touch sensors are configured to detect, via the at least three sensors of the plurality of touch sensors, the user input for all angular orientations of the wireless earbud between 85 degrees forward of the initial vertical position of the vertical centerline and 85 degrees rearward of the initial vertical position of the vertical centerline.

3. The electronic device of claim 1, wherein the user input comprises a horizontal swipe across the surface of the wireless earbud.

4. The electronic device of claim 1, wherein the wireless earbud is stemless.

5. The electronic device of claim 1, wherein the plurality of touch sensors are capacitive touch sensors.

6. An electronic device comprising:

a touch-sensing device comprising a plurality of touch sensors arranged in a pattern configured to detect user input at a plurality of angular orientations, the plurality of touch sensors comprising:

a first sensor having a first end, a second end, a first outer arc connecting the first end to the second end, a first inner arc connecting the first end to the second end, and a first horizontal centerline, the first sensor having a first variable width between the first outer arc and the first inner arc, the first variable width having a largest width at substantially the first horizontal centerline;

a second sensor having a third end, a fourth end, a second outer arc connecting the third end to the fourth end, a second inner arc connecting the third end to the fourth end, and a second horizontal centerline, the second sensor having a second variable width between the second outer arc and the second inner arc, the second variable width having a largest width at substantially the second horizontal centerline;

a third sensor positioned between the first sensor and the second sensor, the third sensor having a fifth end, a sixth end, and a first length that extends from the fifth end to the sixth end, the fifth end proximate to the third end of the second sensor and the sixth end proximate to the fourth end of the second sensor;

a fourth sensor positioned between the first sensor and the third sensor, the fourth sensor having a seventh end, an eighth end, and a second length that extends from the seventh end to the eighth end, the seventh end proximate to the first end of the first sensor and the eighth end proximate to the first horizontal centerline; and a fifth sensor positioned between the first sensor and the third sensor, the fifth sensor having a ninth end, a tenth end, and a third length that extends from the ninth end to the tenth end, the tenth end proximate to the second end of the first sensor and the ninth end proximate to the first horizontal centerline, wherein the electronic device comprises a wireless earbud, the electronic device further comprising a vertical centerline for the touch-sensing device, the vertical centerline having an initial vertical position, and wherein the plurality of touch sensors is disposed proximate to a surface of the wireless earbud, the plurality of touch sensors configured to detect, via at least three sensors of the plurality of touch sensors, user input at the surface of the wireless earbud, and wherein the third sensor includes a first arcuate side proximate to the second sensor and a first flat side proximate to the fourth and fifth sensors.

7. The electronic device of claim 6, wherein the fourth sensor includes a second arcuate side proximate to the first sensor, a second flat side proximate to the third sensor, and a third flat side proximate to the fifth sensor.

8. The electronic device of claim 7, wherein the fifth sensor includes a third arcuate side proximate to the first sensor, a fourth flat side proximate to the third sensor, and a fifth flat side proximate to the fourth sensor.

9. The electronic device of claim 8, further comprising:

a first gap positioned between the first inner arc of the first sensor and the second and third arcuate sides of the fourth and fifth sensors;

a second gap positioned between the second inner arc of the second sensor and the first arcuate side of the third sensor;

a third gap positioned between the first flat side of the third sensor and the second and fourth flat sides of the fourth and fifth sensors; and a fourth gap positioned between the third flat side of the fourth sensor and the fifth flat side of the fifth sensor.

10. The electronic device of claim 9, wherein the fourth gap is substantially aligned with the first and second horizontal centerlines.

11. The electronic device of claim 10, wherein the third gap is offset from the vertical centerline and the fourth and fifth sensors are configured to detect a vertical swipe substantially along the vertical centerline.

12. The electronic device of claim 11, further comprising:

a substantially circular gap positioned between the third sensor, the fourth sensor, and the fifth sensor.

13. The electronic device of claim 12, wherein the first and second sensors are substantially crescent-shaped, the third sensor is substantially semioval-shaped, and the fourth and fifth sensors are each substantially shaped as a quarter of an oval.

14. An electronic device comprising:

a touch-sensing device comprising a plurality of touch sensors arranged in a pattern configured to detect user input at a plurality of angular and horizontal orientations, the plurality of touch sensors comprising:

a first sensor;

a second sensor;

a third sensor;

a fourth sensor; and a fifth sensor, wherein:

the touch-sensing device includes a vertical centerline having an initial vertical position;

the plurality of touch sensors is disposed proximate to a surface of the touch-sensing device; and the plurality of touch sensors are configured to detect, via at least three sensors of the plurality of touch sensors, the user input for:

angular orientations between 85 degrees forward of the initial vertical position of the vertical centerline and 85 degrees rearward of the initial vertical position of the vertical centerline; and horizontal orientations perpendicular to the vertical centerline from a top portion proximate a first end of the vertical centerline to a bottom portion proximate an opposing second end of the vertical centerline.

15. The electronic device of claim 14, wherein the plurality of touch sensors are configured to detect, via at the least three sensors of the plurality of touch sensors, the user input, the user input being a horizontal swipe for all horizontal orientations perpendicular to the vertical centerline from the top portion to the bottom portion.

16. The electronic device of claim 14, wherein the plurality of touch sensors are configured to detect, via at the least three sensors of the plurality of touch sensors, the user input, the user input being a horizontal swipe of the horizontal orientations that intersects a center of the plurality of touch sensors.

17. The electronic device of claim 14, wherein the electronic device comprises a wireless earbud.

18. The electronic device of claim 17, wherein the wireless earbud is stemless.

19. The electronic device of claim 14, wherein:

the first sensor has a first end, a second end, a first outer arc connecting the first end to the second end, a first inner arc connecting the first end to the second end, and a first horizontal centerline, the first sensor has a first variable width between the first outer arc and the first inner arc, the first variable width has a largest width at substantially the first horizontal centerline;

a second sensor has a third end, a fourth end, a second outer arc connecting the third end to the fourth end, a second inner arc connecting the third end to the fourth end, and a second horizontal centerline, the second sensor has a second variable width between the second outer arc and the second inner arc, the second variable width has a largest width at substantially the second horizontal centerline;

a third sensor positioned between the first sensor and the second sensor, the third sensor has a fifth end, a sixth end, and a first length that extends from the fifth end to the sixth end, the fifth end proximate to the third end of the second sensor and the sixth end proximate to the fourth end of the second sensor;

a fourth sensor positioned between the first sensor and the third sensor, the fourth sensor has a seventh end, an eighth end, and a second length that extends from the seventh end to the eighth end, the seventh end proximate to the first end of the first sensor and the eighth end proximate to the first horizontal centerline; and a fifth sensor positioned between the first sensor and the third sensor, the fifth sensor has a ninth end, a tenth end, and a third length that extends from the ninth end to the tenth end, the tenth end proximate to the second end of the first sensor and the ninth end proximate to the first horizontal centerline.

20. The electronic device of claim 19, wherein three or more of the plurality of sensors include an arcuate side.

* * * * *